(12) United States Patent
Matsumoto et al.

(10) Patent No.: US 9,212,080 B2
(45) Date of Patent: Dec. 15, 2015

(54) GLASS FILM CLEAVING METHOD AND GLASS FILM LAMINATE (71) Applicant: NIPPON ELECTRIC GLASS CO., LTD., Shiga (JP)

(72) Inventors: Yasuhiro Matsumoto, Moriyama (JP); Naohiko Yagi, Nagahama (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 0 days.

(21) Appl. No.: 13/856,106

(22) Filed: Apr. 3, 2013

(65) Prior Publication Data
US 2013/0280465 A1 Oct. 24, 2013

(30) Foreign Application Priority Data

Apr. 5, 2012 (JP) ................................. 2012-086559
Jul. 13, 2012 (JP) ................................. 2012-157670

(51) Int. Cl.
B23K 26/00 (2014.01)
C03B 33/02 (2006.01)
B26F 3/00 (2006.01)
(Continued)

(52) U.S. Cl.
CPC ............ *C03B 33/0222* (2013.01); *B26F 3/002* (2013.01); *B32B 17/06* (2013.01); *C03B 33/091* (2013.01); *C03B 33/033* (2013.01); *C03B 33/076* (2013.01); *Y10T 225/12* (2015.04); *Y10T 428/15* (2015.01)

(58) Field of Classification Search
CPC ...... C03B 33/0222; B26F 3/002; B32B 17/06

USPC .............. 219/121.67, 121.68, 121.69, 121.7, 219/121.71; 65/112; 428/157, 215, 428

See application file for complete search history.

(56) References Cited

U.S. PATENT DOCUMENTS 6,423,930 B1 * 7/2002 Matsumoto .............. 219/121.69
2006/0201983 A1 * 9/2006 Kusama ................ C03B 33/076
                                                                225/2
(Continued)

FOREIGN PATENT DOCUMENTS

CN      101687342    *   3/2010    ............ B23K 26/00
CN      102219369        10/2011
(Continued)

OTHER PUBLICATIONS

International Search Report issued Jul. 9, 2013 in International (PCT) Application No. PCT/JP2013/060152.
(Continued)

*Primary Examiner* — Thien S Tran
(74) *Attorney, Agent, or Firm* — Wenderoth, Lind & Ponack, L.L.P.

(57) ABSTRACT

A glass film cleaving method includes cleaving a full-body of a glass film having a thickness of 200 μm or less by propagating an initial crack along a preset cleaving line through heating of the glass film with a laser beam followed by subsequent cooling of the glass film. The method also includes manufacturing a glass film laminate by setting a surface roughness Ra of a surface of the glass film to contact a support glass, which supports the glass film, and a surface of the support glass to contact the glass film to 2.0 nm or less, and by bringing the surfaces of the glass film and the support glass into surface contact with each other, followed by the cleaving.

2 Claims, 7 Drawing Sheets (51) Int. Cl.
  *C03B 33/09* (2006.01)
  *B32B 17/06* (2006.01)
  *C03B 33/033* (2006.01)
  *C03B 33/07* (2006.01)

(56) References Cited

U.S. PATENT DOCUMENTS

| | | | |
|---|---|---|---|
| 2007/0090100 A1* | 4/2007 | Yonai et al. | 219/121.69 |
| 2008/0309867 A1 | 12/2008 | Kampstra | |
| 2010/0210442 A1* | 8/2010 | Abramov et al. | 501/66 |
| 2010/0291353 A1* | 11/2010 | Dejneka et al. | 428/192 |
| 2012/0080403 A1 | 4/2012 | Tomamoto et al. | |
| 2012/0202010 A1* | 8/2012 | Uchida | 428/157 |

FOREIGN PATENT DOCUMENTS

| | | | |
|---|---|---|---|
| JP | 2001-58281 | 3/2001 | |
| JP | 2009-516863 | 4/2009 | |
| JP | 2011-116611 | 6/2011 | |
| WO | 2009/011246 | 1/2009 | |
| WO | 2011/048979 | 4/2011 | |
| WO | WO 2011/048979 A1 * | 4/2011 | B32B 17/00 |
| WO | 2011/086991 | 7/2011 | |

OTHER PUBLICATIONS

International Preliminary Report on Patentability issued in International Application No. PCT/JP2013/060152 on Oct. 7, 2014.
First Office Action issued Sep. 28, 2015 in corresponding Chinese Application No. 201380004902.6 (with partial English translation).

* cited by examiner

GLASS FILM CLEAVING METHOD AND GLASS FILM LAMINATE

TECHNICAL FIELD

The present invention relates to a glass film cleaving method and a glass film laminate, and more particularly, to a full-body cleaving of a glass film utilizing laser heating.

BACKGROUND ART

As is well known, in a process of manufacturing glass sheet products as typified by glass substrates for a flat panel display and the like, a small-area glass sheet is cut out of a large-area glass sheet and an edge portion extending along each side of the glass sheet is trimmed off, to thereby dice the glass sheet. As a method therefor, a method of cleaving a glass sheet is taken as an example.

Figure 7:
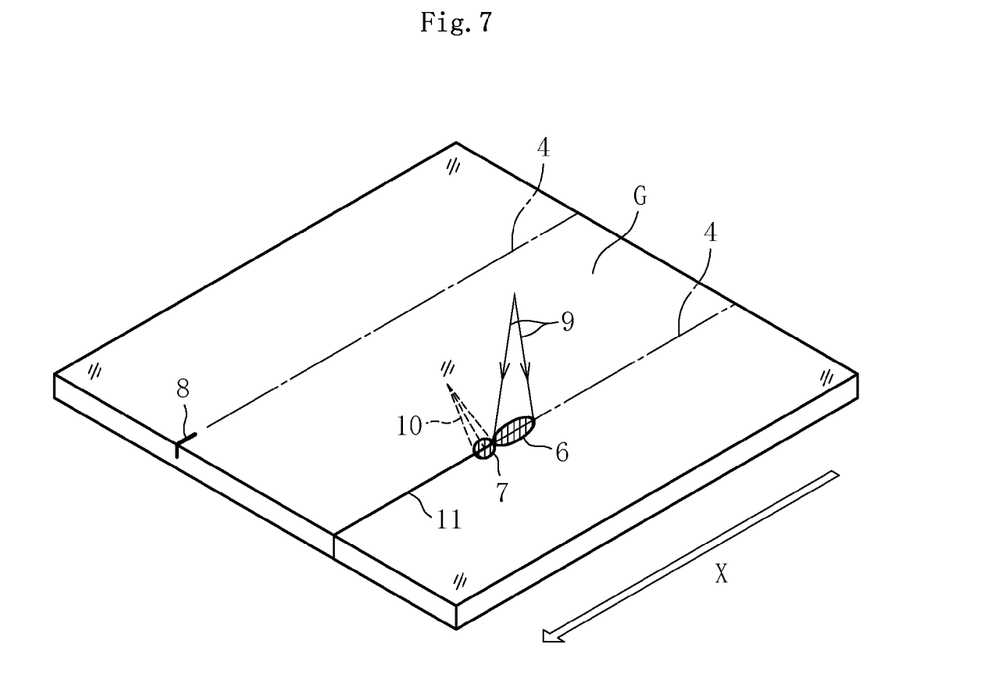
FIG. 7 is a perspective view illustrating a glass sheet cleaving method according to a conventional technology.

As one method of cleaving a glass sheet, there is known a cleaving method utilizing laser heating (hereinafter referred to as "laser cleaving method") as illustrated in FIG. 7. In the method illustrated in FIG. 7, while moving a glass sheet G in an X direction along a preset cleaving line 4, the glass sheet G is irradiated with a laser beam 9 in a spot shape along the preset cleaving line 4 and a coolant 10 such as water is jetted following the laser beam 9.

Then, a thermal stress is generated due to a temperature difference between a heated portion 6 formed by heating the glass sheet G with the laser beam 9 and a cooled portion 7 formed by cooling apart of the heated portion 6 with the coolant 10. Through an action of the thermal stress, an initial crack 8 formed at an end portion of the glass sheet G is propagated along the preset cleaving line 4 and a cleaved portion 11 is continuously formed, to thereby carry out a full-body cleaving of the glass sheet G (see, for example, Patent Literature 1).

CITATION LIST

Patent Literature

Patent Literature 1: JP 2011-116611 A

SUMMARY OF INVENTION

Technical Problems

By the way, in recent years, it has been proposed that a glass sheet having a thickness of 200 µm or less, that is, a glass film, be employed as a material for a flexible display, application, or component, and therefore thinning of the glass sheet has been promoted. The above-mentioned technology disclosed in Patent Literature 1 is applicable to a full-body cleaving of such a glass film as well as a thick glass sheet, but the following problems arise when cleaving a glass film by the technology disclosed in Patent Literature 1.

Figure 8A:
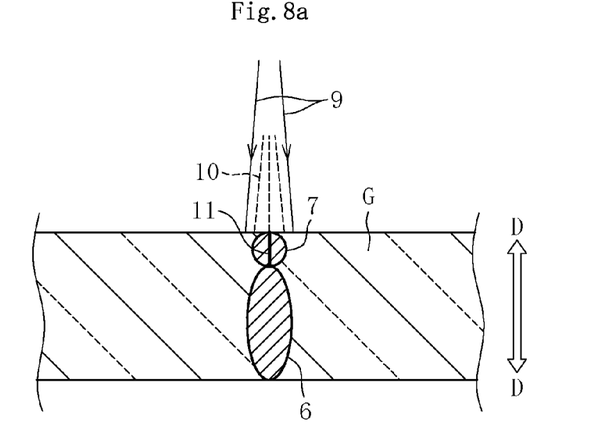
FIG. 8a is a sectional view illustrating the glass sheet cleaving method according to the conventional technology.

Specifically, when cleaving a thick glass sheet by the laser cleaving method, due to the thickness thereof, both the heated portion 6 and the cooled portion 7 may easily be formed in a thickness direction D of the glass sheet G as illustrated in FIG. 8a. Therefore, the glass sheet G can be cleaved smoothly by propagating the cleaved portion 11 along the thickness direction D through the action of the thermal stress generated due to the temperature difference between the heated portion 6 and the cooled portion 7.

Figure 8B:
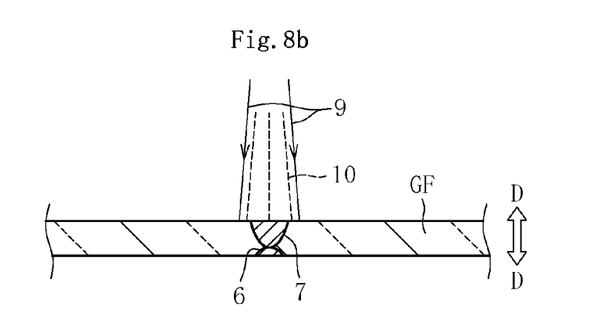
FIG. 8b is a sectional view illustrating a glass film cleaving method according to the conventional technology.
Figure 8C:
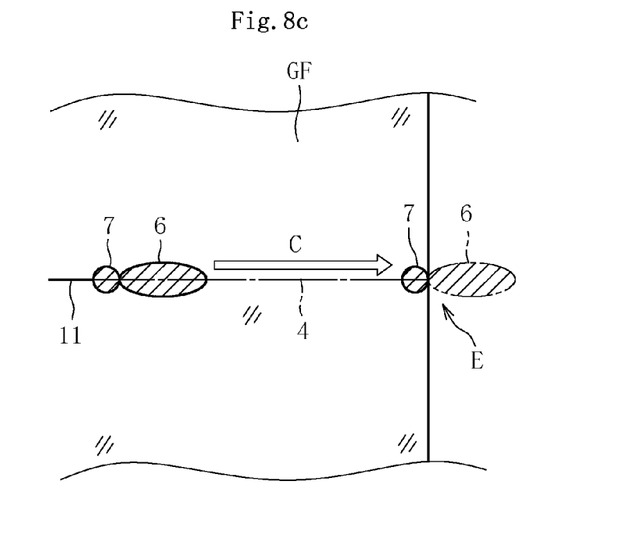
FIG. 8c is a plan view illustrating the glass film cleaving method according to the conventional technology.

On the other hand, the glass film having a thickness of 200 µm or less is extremely thin and is therefore not sufficiently thick to form both the heated portion 6 and the cooled portion 7 along the thickness direction D as illustrated in FIG. 8b. Thus, the heated portion 6 is not formed sufficiently. Therefore, when cleaving a glass film GF, as illustrated in FIG. 8c, the cleaved portion 11 is propagated in a direction C through the action of the thermal stress generated due to the temperature difference between the heated portion 6 and the cooled portion 7 that are formed along a surface of the glass film GF. In this manner, the glass film GF is cleaved.

As illustrated in FIG. 8c, however, at a terminal end portion E of the preset cleaving line 4 in the cleaving advancing direction C, the glass film GF is not present on an extension line of the preset cleaving line 4, and hence there is a problem in that only the cooled portion 7 can be formed and the heated portion 6 indicated by the two-dot chain line cannot be formed. As a result, a desired thermal stress for propagating the cleaved portion 11 cannot act at the terminal end portion E, and hence it is difficult to cleave the glass film GF smoothly.

Therefore, when cleaving the glass film having a thickness of 200 µm or less by the laser cleaving method, as described above, it is currently difficult to carry out satisfactory cleaving even by the conventional method involving propagating the cleaved portion in the thickness direction of the glass film, and by the conventional method involving propagating the cleaved portion in the direction along the surface of the glass film.

The present invention has been made in view of the above-mentioned circumstances, and it is therefore a technical object thereof to smoothly cleave a glass film having a thickness of 200 µm or less by a laser cleaving method.

Solution to Problem

According to the present invention devised to achieve the above-mentioned object, there is provided a glass film cleaving method, comprising: a full-body cleaving step of cleaving a full-body of a glass film having a thickness of 200 µm or less by propagating an initial crack along a preset cleaving line through laser heating of the glass film followed by subsequent cooling of the glass film; and a laminate manufacturing step of manufacturing a glass film laminate by setting a surface roughness Ra of each of a surface of the glass film to be brought into contact with a support glass, which is configured to support the glass film, and a surface of the support glass to be brought into contact with the glass film to 2.0 nm or less, and by bringing the surface of the glass film and the surface of the support glass into surface contact with each other, followed by the full-body cleaving step.

According to this method, the surfaces of the glass film and the support glass to be brought into contact with each other are smooth surfaces each having the surface roughness of 2.0 nm or less, and hence a moderate adhesion force is generated between the glass film and the support glass that are laminated in the laminate manufacturing step. In this case, this adhesion force may be generated due to a hydrogen bond. Accordingly, the glass film and the support glass, which are supposed to be different components of the glass film laminate, serve as a single thick glass sheet. Further, by securing a sufficient thickness, in the thickness direction of the laminate, the heated portion may easily be formed by heating the glass film with the laser beam, and further, the cooled portion may easily be formed by cooling a part of the heated portion. As a result, in the full-body cleaving step, through the action of the thermal stress generated due to the temperature difference between the heated portion and the cooled portion, the cleaved portion formed in the glass film can be propagated along the thickness direction, and thus the glass film can be cleaved smoothly.

In the above-mentioned method, the support glass may comprise support glasses arranged so as to extend along the preset cleaving line.

With this configuration, the area of the contact surfaces of the glass film and the support glasses is reduced, and hence, as compared to the case where the glass film and the support glass are laminated in contact with each other over the entire surfaces thereof, it is possible to avoid such a situation that creases are generated due to local separation of the glass film from the support glass in the laminate manufacturing step. Thus, it is possible to reduce a risk of strain that may occur in the glass film due to the separation of the glass film. Further, when the glass film is separated from the support glass after the full-body cleaving step is completed, the separation of the glass film is facilitated. Moreover, when the support glass is washed and dried or inspection is carried out for the presence or absence of remaining foreign matter after the glass film is separated from the support glass, it is possible to reduce the time and effort to be required for those kinds of work.

In the above-mentioned method, it is preferred that the preset cleaving line comprise: a first preset cleaving line extending in a first direction of the glass film; and a second preset cleaving line extending in a second direction orthogonal to the first direction.

With this configuration, a rectangular glass film can be obtained after the full-body cleaving step, and hence a glass film having high frequency of use can be obtained. Further, as a result of extensive study of the inventors of the present invention, it is found that the following preferred advantage can be obtained when carrying out the full-body cleaving step along the second preset cleaving line (hereinafter referred to as "second cleaving step") after carrying out the full-body cleaving step along the first preset cleaving line (hereinafter referred to as "first cleaving step"). Specifically, in order to carry out the second cleaving step, it has conventionally been necessary to form the initial crack at each intersection point between the second preset cleaving line and an end portion of each glass film that is cleaved in the first cleaving step. However, according to the method of the present invention, the second cleaving step can be carried out if the initial crack is formed only at one of the above-mentioned intersection points, which is located closest to the leading end of the second preset cleaving line. Thus, it is found that this method is significantly advantageous from the viewpoint of manufacturing efficiency. This preferred advantage may be obtained for the following reason. Specifically, due to the adhesion force generated between the glass film and the support glass, the laminated glass film and support glass are not easily displaced. Therefore, in the cleaved portion of the glass film that is formed in the first cleaving step, a gap formed between opposing cleaved surfaces of the cleaved glass films is small to the extent that the gap is substantially absent. Thus, the cleaved portion formed in the second cleaving step can be propagated across the gap. As a result, the glass film can be cleaved smoothly even in second cleaving step.

Further, according to the present invention, there is provided a glass film laminate comprising: a glass film having a thickness of 200 μm or less; and a support glass, which is configured to support the glass film, wherein a surface of the glass film to be brought into contact with the support glass has a surface roughness Ra of 2.0 nm or less, and a surface of the support glass to be brought into contact with the glass film has a surface roughness Ra of 2.0 nm or less, wherein the surface of the glass film and the surface of the support glass are brought into surface contact with each other to laminate the glass film and the support glass, wherein the glass film is subjected to full body cleaving by propagating an initial crack through laser heating of the glass film followed by subsequent cooling of the glass film.

With this configuration, it is possible to produce similar actions and effects to those described above for the glass film cleaving method. Therefore, the glass film is in a state of being cleaved smoothly. Thus, when separating the cleaved glass films after the full-body cleaving, the separation can be carried out in a good condition.

Advantageous Effects of Invention

As described above, according to the present invention, it is possible to smoothly cleave the glass film having a thickness of 200 μm or less by the laser cleaving method.

BRIEF DESCRIPTION OF DRAWINGS

FIG. 3b is a sectional view taken along the line A-A of FIG. 3a.

FIG. 4b is an enlarged view illustrating the point B of FIG. 4a.

DESCRIPTION OF EMBODIMENTS

In the following, a glass film cleaving method according to embodiments of the present invention is described with reference to the accompanying drawings. Note that, in the following embodiments, description is given of a case where a single glass film (mother glass) is diced into nine glass films by a laser cleaving method.

Figure 1A:
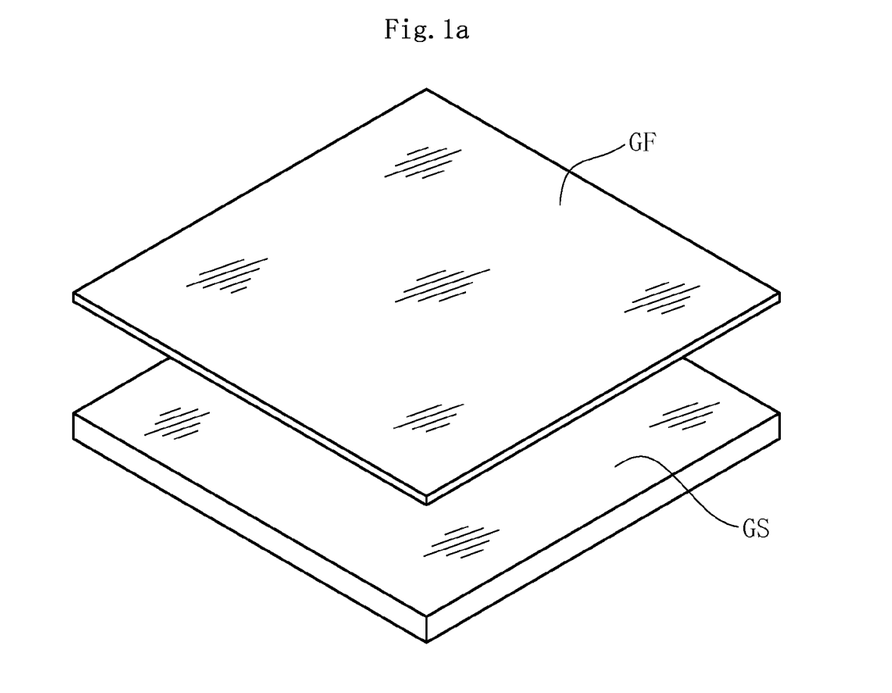
FIG. 1a is a perspective view illustrating a laminate manufacturing step of a glass film cleaving method according to a first embodiment of the present invention.
Figure 1B:
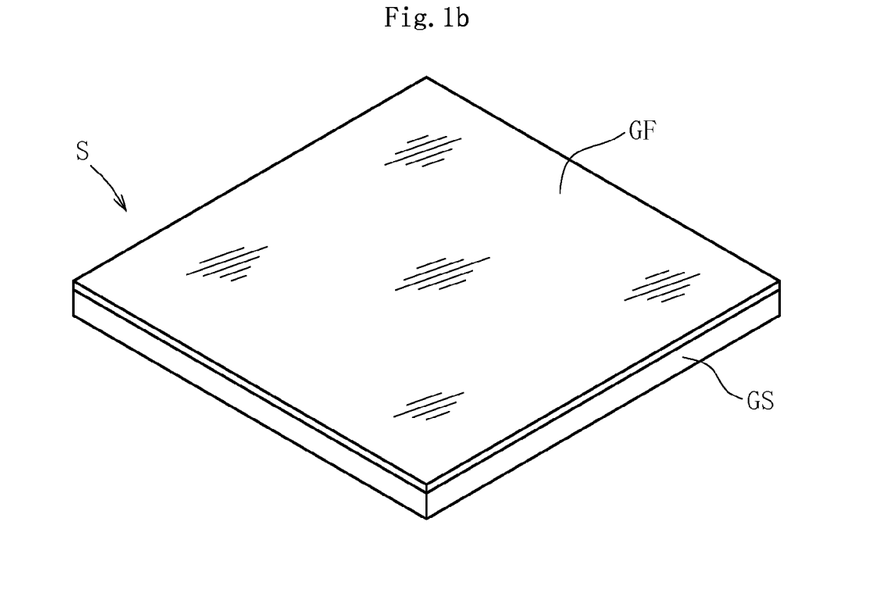
FIG. 1b is a perspective view illustrating the laminate manufacturing step of the glass film cleaving method according to the first embodiment of the present invention.

FIGS. 1a and 1b are perspective views illustrating a laminate manufacturing step of a glass film cleaving method according to a first embodiment of the present invention. As illustrated in FIGS. 1a and 1b, the area of a surface of a glass film GF to be brought into contact with a support glass GS is equal to the area of a surface of the support glass GS to be brought into contact with the glass film GF, and those surfaces are smooth surfaces each having a surface roughness Ra of 2.0 nm or less. Further, the glass film GF has a thickness of 200 μm, and the support glass configured to support the glass film GF has a thickness of 500 μm. In addition, the kinds of glass of the glass film GF and the support glass GS are both alkali-free glass. Note that, it is preferred that the thickness of the glass film GF be 1 to 200 μm, and the thickness of the support glass GS be 300 to 1,100 μm.

When a glass film laminate S (hereinafter referred to simply as "laminate S") is manufactured by laminating the glass film GF and the support glass GS, a moderate adhesion force is generated between the glass film GF and the support glass GS. This adhesion force may be generated due to a hydrogen bond. Accordingly, the glass film GF and the support glass GS, which are supposed to be different components of the laminate S, serve as a single thick glass sheet (as a unit). In this case, the laminate S used in this embodiment has a thickness of 700 μm (glass film GF: 200 μm, support glass GS: 500 μm), but the present invention is not limited thereto, and the laminate S to be used may have a thickness of 300 to 1,300 μm.

Figure 2:
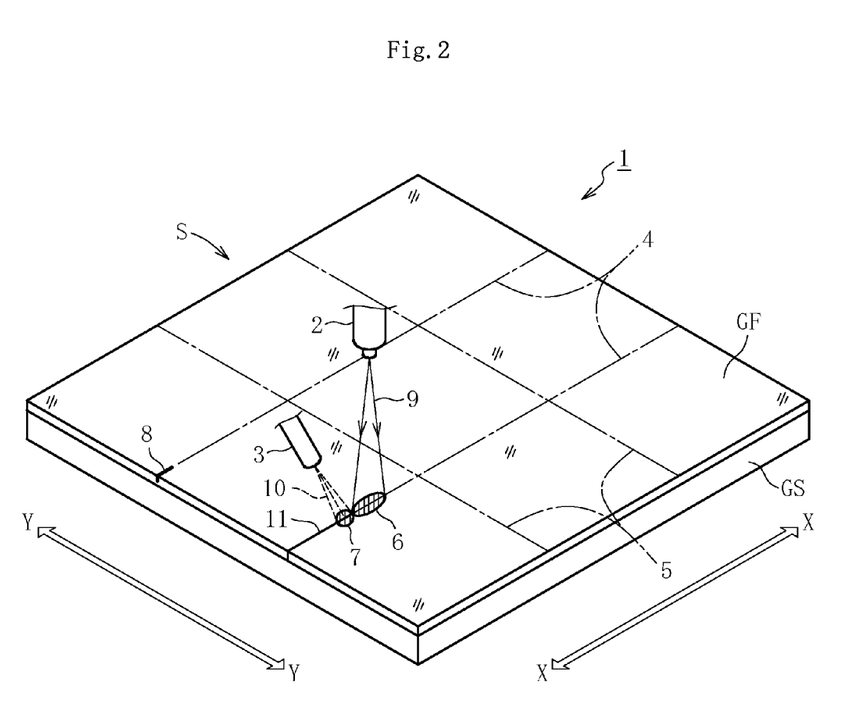
FIG. 2 is a perspective view illustrating a glass film cleaving apparatus to be used in the glass film cleaving method according to the first embodiment of the present invention.

FIG. 2 is a perspective view illustrating a glass film cleaving apparatus 1 (hereinafter referred to simply as "cleaving apparatus 1") to be used in the glass film cleaving method according to the first embodiment of the present invention. The cleaving apparatus 1 comprises a processing base (not shown) configured to support the laminate S and move in a horizontal plane, a laser irradiation device 2 configured to irradiate the glass film GF of the laminate S supported by the processing base with a laser beam 9, and a coolant jetting nozzle 3 configured to jet a coolant 10 toward the glass film GF following the laser beam 9.

The processing base is movable in the horizontal plane along an X direction of FIG. 2 and a Y direction orthogonal to the X direction.

The laser irradiation device 2 is installed at a fixed point, and along with the movement of the processing base in the X direction and the Y direction, irradiates the glass film GF with the laser beam 9 in a spot shape along each of first preset cleaving lines 4 of the glass film GF and each of second preset cleaving lines 5 orthogonal to the first preset cleaving lines 4. In this manner, the glass film GF is heated to form a heated portion 6.

The coolant jetting nozzle 3 is installed at a fixed point in a manner similar to that of the laser irradiation device 2, and jets the coolant 10 toward the heated portion 6 following the laser beam 9. In this manner, a part of the heated portion 6 is cooled to form a cooled portion 7 in the glass film GF.

In the following, the glass film cleaving method using the above-mentioned cleaving apparatus 1 is described.

Figure 3A:
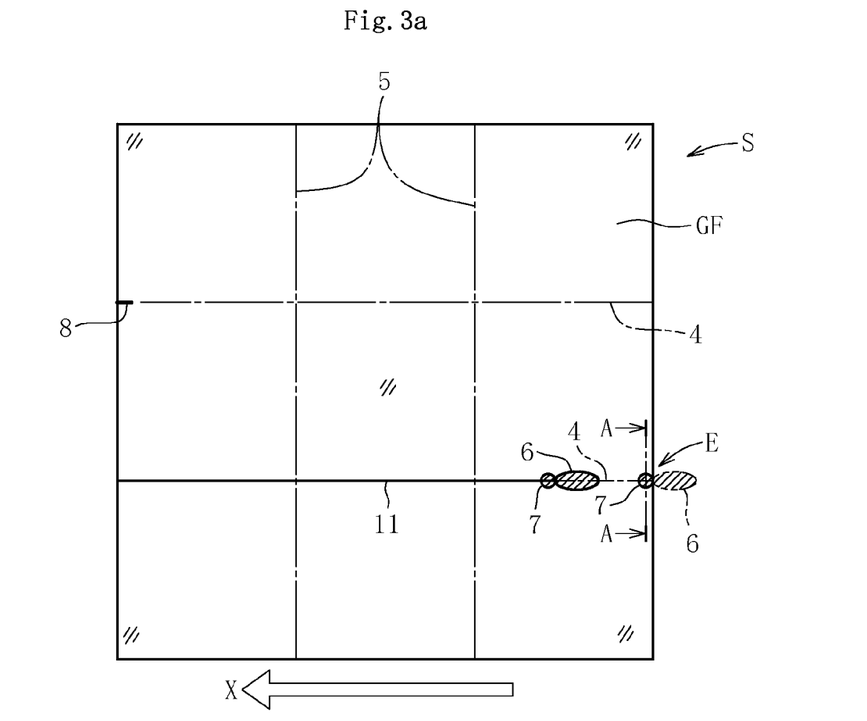
FIG. 3a is a plan view illustrating a full-body cleaving step of the glass film cleaving method according to the first embodiment of the present invention.

First, as illustrated in FIG. 3a, the processing base (not shown) is moved in the X direction. Then, a thermal stress is generated due to a temperature difference between the heated portion 6 and the cooled portion 7 that are formed in a direction along the surface of the glass film GF. Through an action of the thermal stress, an initial crack 8 formed at an end portion of the glass film GF is propagated with a diamond cutter or the like. Then, a cleaved portion 11 is continuously formed along the first preset cleaving line 4, to thereby carry out a full-body cleaving step for the glass film GF in the first direction.

At this time, at a terminal end portion E of the first preset cleaving line 4, the glass film GF is not present on an extension line of the first preset cleaving line 4, and hence, in the direction along the surface of the glass film GF, only the cooled portion 7 is formed and the heated portion 6 indicated by the two-dot chain line is not formed.

Figure 3B:
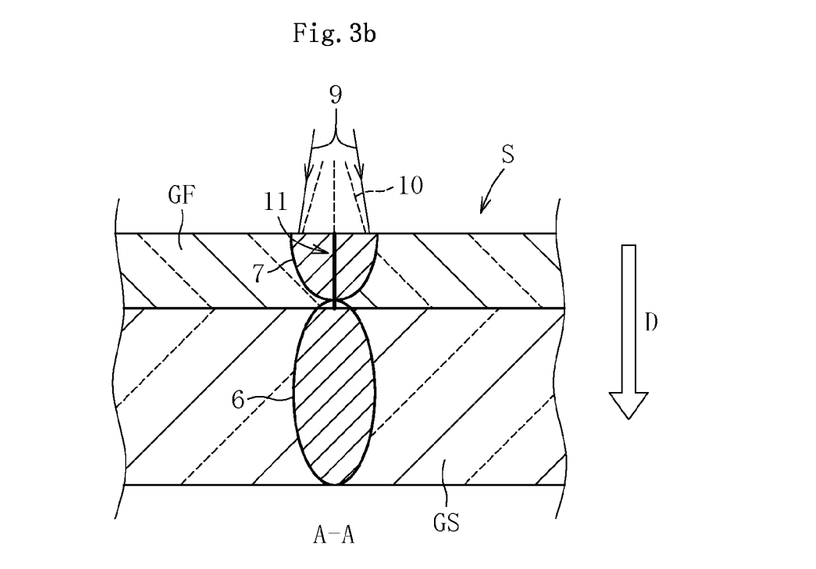

However, the glass film GF and the support glass GS are laminated to secure a sufficient thickness, and the glass film GF and the support glass GS serve as a single thick glass sheet (as a unit). Thus, as illustrated in FIG. 3b, both the heated portion 6 and the cooled portion 7 may easily be formed in a thickness direction of the laminate S. As a result, through the action of the thermal stress generated due to the temperature difference between the heated portion 6 and the cooled portion 7, the cleaved portion 11 formed in the glass film GF can be propagated along a D direction of FIG. 3b, and thus the glass film GF can be cleaved smoothly even at the terminal end portion E.

When the full-body cleaving step for the glass film GF in the first direction is completed as described above, as illustrated in FIG. 4a, the processing base (not shown) is moved in the Y direction, and a cleaved portion 12 is continuously formed along the second preset cleaving line 5, to thereby carry out a full-body cleaving step for the glass film GF in the second direction.

Figure 4A:
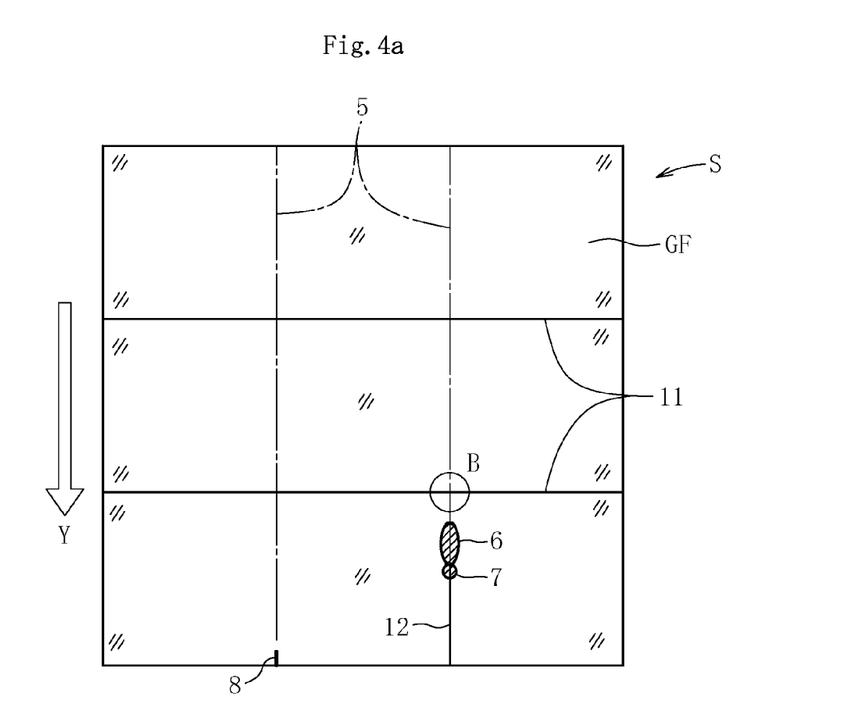
FIG. 4a is a plan view illustrating the full-body cleaving step of the glass film cleaving method according to the first embodiment of the present invention.

At this time, in order to carry out the full-body cleaving step in the second direction, it has conventionally been necessary to form the initial crack 8 at each intersection point between the second preset cleaving line 5 and an end portion of each glass film GF that is cleaved at the time of the full-body cleaving step in the first direction.

However, according to the method of this embodiment, the full-body cleaving step in the second direction can be carried out if the initial crack 8 is formed only at one of the above-mentioned intersection points, which is located closest to the leading end of the second preset cleaving line 5. Thus, it is found that this method is significantly advantageous from the viewpoint of manufacturing efficiency. This preferred advantage may be obtained for the following reason.

Figure 4B:
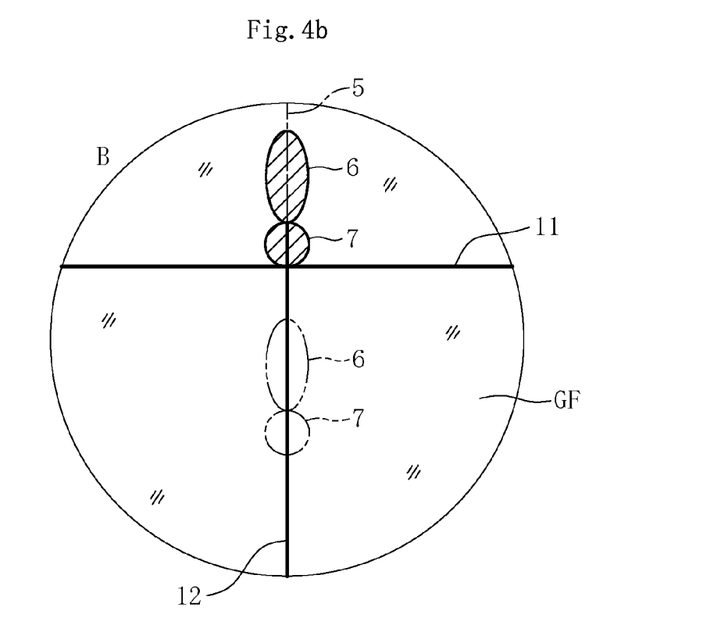

Specifically, due to the adhesion force between the glass film GF and the support glass GS, the laminated glass film GF and support glass GS are not easily displaced. Therefore, in the cleaved portion 11 of the glass film that is formed in the full-body cleaving step in the first direction, a gap formed between opposing cleaved surfaces of the cleaved glass films GF is small to the extent that the gap is substantially absent. Thus, as illustrated in FIG. 4b, the cleaved portion 12 can be propagated across the gap. As a result, the glass film can be cleaved smoothly even in the full-body cleaving step in the second direction.

Further, according to the method as described above, there is no need to use an adhesive or the like so as to laminate and adhere the glass film GF and the support glass GS to each other, and thus it is possible to prevent contamination of the surface of the glass film GF to be brought into contact with the support glass GS. In addition, the atoms of the glass film GF and the support glass GS are not firmly bonded to each other, and thus it is possible to avoid such a situation that the cleaved portions 11 and 12 are propagated up to the support glass GS beyond the glass film GF. Accordingly, a flaw can be prevented from being generated in the support glass GS in the full-body cleaving step, and hence the support glass GS can be reused. As a result, this method is significantly advantageous from the viewpoint of manufacturing cost as well.

In addition, when separating the glass films GF obtained through the full-body cleaving step as described above, the glass films GF are smoothly cleaved so that the glass films GF can be separated in a good condition.

Note that, it is preferred that the temperatures of the surfaces of the laminated glass film GF and support glass GS to be brought into contact with each other be less than 250° C. in the full-body cleaving step described above. When the temperatures of the respective surfaces rise up to a temperature of 250° C. or more, the glass film GF is not easily separated from the support glass GS after the full-body cleaving step is completed. This is because a source of the adhesion force between the glass film GF and the support glass GS may change from the hydrogen bond to a covalent bond, which generates a greater adhesion force, along with the rise in temperatures of the surfaces of the glass film GF and the support glass GS to be brought into contact with each other.

Figure 5:
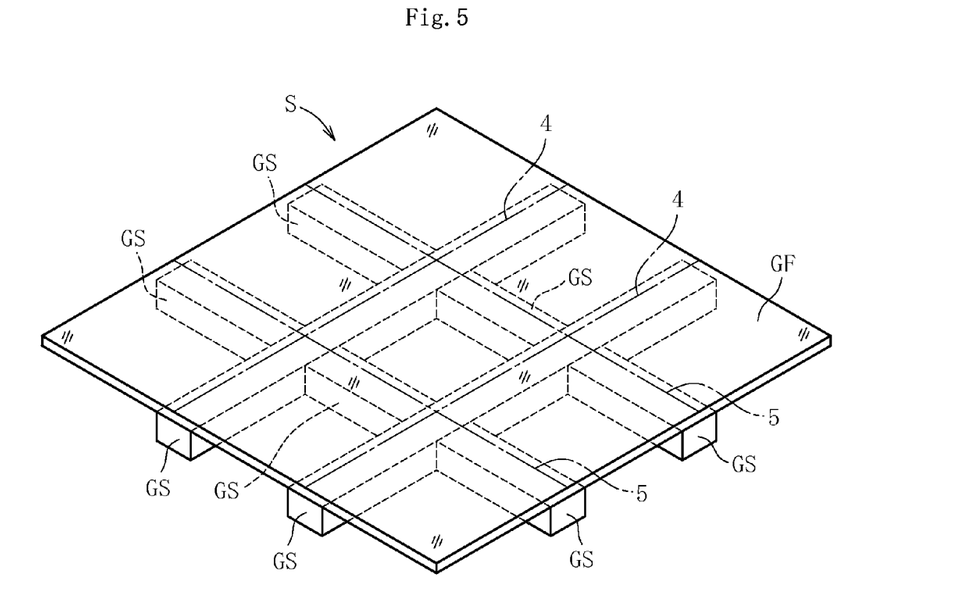
FIG. 5 is a perspective view illustrating a laminate manufacturing step of a glass film cleaving method according to a second embodiment of the present invention.

FIG. 5 is a perspective view illustrating a laminate manufacturing step of a glass film cleaving method according to a second embodiment of the present invention. The laminate manufacturing step of the glass film cleaving method according to the second embodiment is different from the laminate manufacturing step of the glass film cleaving method according to the above-mentioned first embodiment in that the support glass GS comprises support glasses arranged so as to extend along the first preset cleaving lines 4 and the second preset cleaving lines 5.

The support glass GS comprises two longer support glasses GS extending in a direction along the first preset cleaving lines 4, and six shorter support glasses GS extending in a direction along the second preset cleaving lines 5. The shorter support glasses GS abut against the longer support glasses GS at one or both end portions of the shorter support glasses GS, and are arranged in a direction orthogonal to the longer support glasses GS under a state in which the longer support glasses GS are each interposed between the shorter support glasses GS.

Also in the case where the glass film GF and the support glasses GS are laminated in this manner, similarly to the above-mentioned first embodiment, the full-body cleaving of the glass film GF can be carried out smoothly. Further, with this configuration, the area of the contact surfaces of the glass film GF and the support glasses GS is reduced, and hence, as compared to the case where the glass film GF and the support glass GS are laminated in contact with each other over the entire surfaces thereof, it is possible to avoid such a situation that creases are generated due to local separation of the glass film GF from the support glass GS in the laminate manufacturing step. Thus, it is possible to reduce a risk of strain that may occur in the glass film GF due to the separation of the glass film GF.

Further, when the glass film GF is separated from the support glass GS after the full-body cleaving step is finished, the separation of the glass film GF is facilitated. Moreover, when the support glass GS is washed and dried or inspection is carried out for the presence or absence of remaining foreign matter after the glass film GF is separated from the support glass GS, it is possible to reduce the time and effort to be required for those kinds of work.

Note that, the glass film cleaving method according to the present invention is not limited to those in the embodiments described above. For example, in the embodiments described above, both of the glass film GF and the support glass GS are alkali-free glass, but various kinds of glass such as soda-lime glass may be used instead. However, it is most preferred to employ alkali-free glass from the viewpoint of strength and durability. Further, the glass film GF and the support glass GS may be made of different kinds of glass.

Moreover, the entire peripheral edge portions of the support glass GS configured to support the glass film GF may project from the entire peripheral edge portions of the glass film GF in the first direction and the second direction. Further, in the second embodiment described above, the support glass GS comprises the longer support glasses GS and the shorter support glasses, but a unit of those longer and shorter support glasses may be used as the support glass GS.

In addition, in the embodiments described above, the heated portion 6 and the cooled portion 7 are formed in the glass film GF by installing the laser irradiation device 2 and the coolant jetting nozzle 3 at fixed points and moving the laminate S. Alternatively, the heated portion 6 and the cooled portion 7 may be formed in the glass film GF by installing the laminate S in a fixed manner and moving the laser irradiation device 2 and the coolant jetting nozzle 3.

EXAMPLES

As examples of the present invention, the full-body cleaving of the glass film in the first direction and the full-body cleaving of the glass film in the second direction orthogonal to the first direction were attempted (hereinafter referred to as "cross cleaving") by the laser cleaving method under the following conditions (seven examples and four comparative examples). Then, success and failure of the cross cleaving under the respective conditions were investigated.

Alkali-free glass (product name: OA-10G) manufactured by Nippon Electric Glass Co., Ltd. was used for each of the glass film and the support glass. The size of the glass was 300 mm long and 300 mm wide. The thickness of the glass in each case was set as shown in Table 1 below. The surface roughness Ra of the glass film was controlled by using unpolished glass formed by an overflow downdraw method, or by performing polishing and chemical etching with the etchant concentration, liquid temperature, and processing time being adjusted.

The surface roughness Ra was measured through use of a scanning prove microscope (NanoNavi II/S-image) manufactured by SII under the conditions of a scanning area of 2,000 nm, a scanning frequency of 0.95 Hz, and a scanning data count of X (first direction): 256 and Y (second direction): 256. Then, the surface roughness Ra of each of the support glass and the glass film was represented by an average value of surface roughnesses Ra measured at two points in total, that is, one point at a center portion and one point at a corner portion of each of the support glass and the glass film.

The glass film and the support glass were washed and dried in a clean room, and the respective surfaces to be brought into contact with each other were subjected to inspection through use of (HS-830) manufactured by Toray Engineering Co., Ltd. so that the number of foreign matter particles with a size of 1 μm or more on the glass was controlled to be 500 particles per square meter or less. After the inspection, the glass film and the support glass were laminated to manufacture a glass film laminate under the combination of Table 1 below.

For the full-body cleaving of the glass film, the glass film laminate was first sucked onto a surface plate for cleaving. After that, at an end portion of the glass film, an initial crack was formed by scribing the glass film with a pressing force of 0.05 MPa through use of a sintered-diamond scribing wheel manufactured by Mitsuboshi Diamond Industrial Co., LTD. (diameter: 2.5 mm, blade thickness: 0.65 mm, wedge angle: 100°).

A laser beam for irradiating the glass film was generated through use of a carbon dioxide laser manufactured by Coherent, Inc. as an elliptical beam that was long in diameter in a direction along the preset cleaving line through an optical lens system. Further, the glass film laminate was heated by irradiating the glass film laminate with the laser beam along the preset cleaving line at a laser output of 160 W and a rate of 400 mm/sec. Then, the glass film laminate was cooled by jetting water following the laser beam at a jetting pressure of 0.4 MPa and a jetting rate of 2 cc/min. In this manner, the initial crack (cleaved portion) was propagated through an action of a thermal stress generated due to a temperature difference between the heated portion and the cooled portion.

As described above, the cross cleaving of the glass film that was 300 mm long and 300 mm wide was attempted by carrying out the full-body cleaving in each of the first direction and the second direction with an interval of 100 mm. Note that, in Comparative Example 4, the cross cleaving of the glass film was attempted without providing the support glass.

Figure 6:
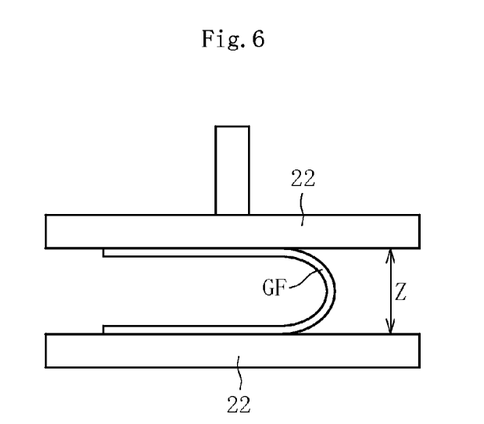
FIG. 6 is a side view illustrating a method of measuring a bending fracture stress of a glass film.

Further, a bending fracture test was carried out for the glass film that was successfully cleaved through the cross cleaving. In this bending fracture test, as illustrated in FIG. 6, the strengths of the glass films GF subjected to the cross cleaving were evaluated by so-called two-point bending, in which the glass films GF were sequentially sandwiched between two plate-like members 22 and were pressed and bent so as to form a U-shaped bend. This evaluation was carried out by calculating a bending fracture stress based on a distance Z between the two plate-like members 22 at the time when each of the glass films GF was broken due to the bending by pressing.

Table 1 shows the success and failure of the cross cleaving under the respective conditions and the values of the bending fracture stress.

TABLE 1

| | Thickness of glass film (μm) | Surface roughness of glass film (nm) | Thickness of support glass (μm) | Surface roughness of support glass (nm) | Success and failure of cross cleaving | Bending fracture stress (MPa) |
|---|---|---|---|---|---|---|
| Example 1 | 200 | 0.2 | 500 | 0.2 | ○ | 300 |
| Example 2 | 200 | 1.0 | 500 | 1.0 | ○ | 350 |
| Example 3 | 200 | 2.0 | 500 | 2.0 | ○ | 320 |
| Example 4 | 100 | 0.2 | 500 | 0.2 | ○ | 340 |
| Example 5 | 100 | 2.0 | 500 | 2.0 | ○ | 350 |
| Example 6 | 50 | 0.2 | 500 | 0.2 | ○ | 360 |
| Example 7 | 50 | 2.0 | 500 | 2.0 | ○ | 400 |
| Comparative Example 1 | 200 | 2.1 | 500 | 0.2 | x | N/A |
| Comparative Example 2 | 200 | 0.2 | 500 | 2.1 | x | |
| Comparative Example 3 | 200 | 2.1 | 500 | 2.1 | x | |
| Comparative Example 4 | 200 | 0.2 | Without support glass | | x | |

Considering the results shown in Table 1 above, the cross cleaving was carried out in a good condition in Examples 1 to 7 of the present invention. This is because the laminated glass film and support glass (laminate) may serve as a single thick glass sheet through an action of a moderate adhesion force generated between the glass film and the support glass by setting the surface roughness Ra of each of their surfaces to be brought into contact with each other to 2.0 nm or less, thus leading to the following effect.

Specifically, in the thickness direction of the laminate, the heated portion may easily be formed by heating the glass film with the laser beam, and further, the cooled portion may easily be formed by cooling a part of the heated portion. Accordingly, at the time of the full-body cleaving, through the action of the thermal stress generated due to the temperature difference between the heated portion and the cooled portion, the cleaved portion formed in the glass film can be propagated along the thickness direction, and thus the glass film can be cleaved smoothly.

Further, in Examples 1 to 7 of the present invention, when carrying out the full-body cleaving in the second direction after carrying out the full-body cleaving in the first direction, the glass film was cleaved without forming an initial crack at each intersection point between the second preset cleaving line and the end portion of each glass film that was cleaved through the full-body cleaving in the first direction.

On the other hand, in Comparative Examples 1 to 4, when carrying out the full-body cleaving in the first direction, the glass film was not cleaved at a part corresponding to the terminal end portion of the first preset cleaving line. Therefore, when separating the glass films after attempting the cross cleaving, it was difficult to separate the adjacent glass films in a good condition.

As a result, according to the glass film cleaving method of the present invention, it is deducible that the glass film having a thickness of 200 μm or less can be cleaved smoothly through the full-body cleaving.

REFERENCE SIGNS LIST

4 first preset cleaving line
5 second preset cleaving line
6 heated portion
7 cooled portion
8 initial crack
9 laser beam
10 coolant
11 cleaved portion
12 cleaved portion
GF glass film
GS support glass
S glass film laminate

The invention claimed is:
1. A glass film cleaving method, comprising:
   manufacturing a glass film laminate by setting respective surface roughnesses Ra of a surface of a glass film and a surface of a support glass which is configured to support the glass film to 2.0 nm or less, and by bringing the surface of the glass film and the surface of the support glass into surface contact with each other; and
   cleaving a full-body of the glass film by propagating an initial crack along a preset cleaving line through laser heating of the glass film followed by subsequent cooling of the glass film;
   wherein the glass film has a thickness of 200 μm or less, wherein the cleaving of the full-body of the glass film occurs while the surface of the glass film and the surface of the support glass are in surface contact with each other, and wherein, in cleaving the full-body of the glass film, the glass film has a first preset cleaving line extending in a first direction and a second preset cleaving line extending in a second direction orthogonal to the first direction; and the glass film is subjected to a first full-body cleaving step along the first preset cleaving line without forming any scribe line, and thereafter the glass film is subjected to a second full-body cleaving step along the second preset cleaving line across a cleaved portion of each of a plurality of glass films cleaved in the first full-body cleaving step without forming any scribe line in a state in which the initial crack is formed only at one of a plurality of end portions of the second preset cleaving line.

2. The glass film cleaving method according to claim 1, wherein the support glass comprises support glasses arranged so as to extend along the first preset cleaving line and the second preset cleaving line.

* * * * *